(12) United States Patent
Champion

(10) Patent No.: US 7,425,382 B2
(45) Date of Patent: Sep. 16, 2008

(54) FUEL CELL ASSEMBLY

(75) Inventor: David Champion, Lebanon, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 378 days.

(21) Appl. No.: 10/620,910

(22) Filed: Jul. 15, 2003

(65) Prior Publication Data

US 2005/0014054 A1   Jan. 20, 2005

(51) Int. Cl.
    *H01M 2/02* (2006.01)
(52) U.S. Cl. .............................. 429/38; 429/34; 429/39
(58) Field of Classification Search ................ 429/31
    See application file for complete search history.

(56) References Cited

U.S. PATENT DOCUMENTS

| | | | |
|---|---|---|---|
| 4,910,100 A * | 3/1990 | Nakanishi et al. ............. | 429/32 |
| 5,509,942 A | 4/1996 | Dodge | |
| 6,001,500 A | 12/1999 | Bass et al. | |
| 6,063,517 A * | 5/2000 | Montemayor et al. ......... | 429/31 |
| 6,258,474 B1 | 7/2001 | Diethelm et al. | |
| 2002/0110716 A1 * | 8/2002 | Holmes et al. ................ | 429/31 |
| 2003/0011721 A1 * | 1/2003 | Wattelet et al. ............... | 349/34 |

FOREIGN PATENT DOCUMENTS

| | | |
|---|---|---|
| JP | 2000-268839 | 9/2000 |
| JP | 2001-038198 | 2/2001 |
| JP | 2003-068314 | 3/2001 |
| WO | WO02/084763 | 10/2002 |
| WO | WO03/010847 | 2/2003 |

OTHER PUBLICATIONS

Shukla et. al., Advances in Mixed-Reactant Fuel cells, Fuel cell 05, 2005, 4, 436-447.*
Office Action from Japanese Patent Office dated Dec. 5, 2006 for App. No. 2004-206,053.

* cited by examiner

*Primary Examiner*—Patrick Ryan
*Assistant Examiner*—Cynthia Lee

(57) ABSTRACT

A fuel cell assembly in accordance with a present invention includes at least one reactant path that extends at least once around the perimeter of the inner region of the assembly and has an upstream end associated with the outer region of the assembly and a downstream end associated with the inner region.

27 Claims, 9 Drawing Sheets

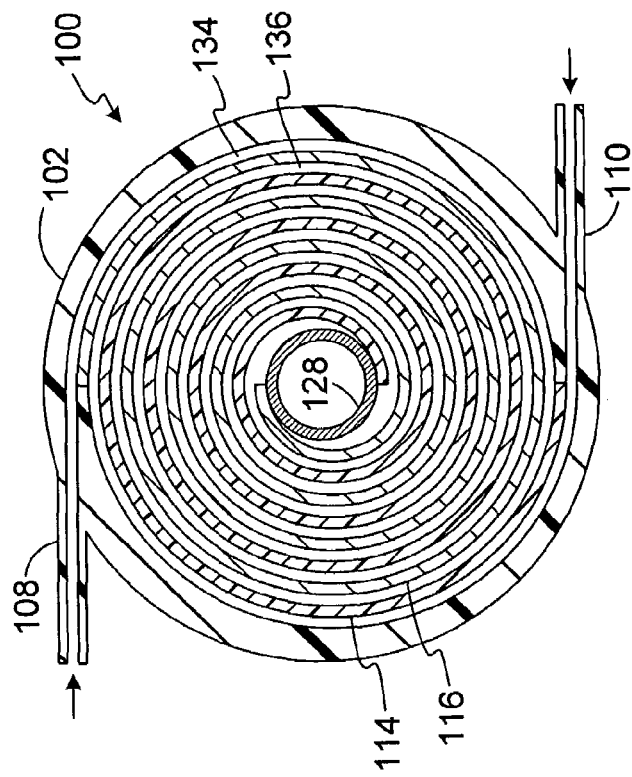
FIG. 4
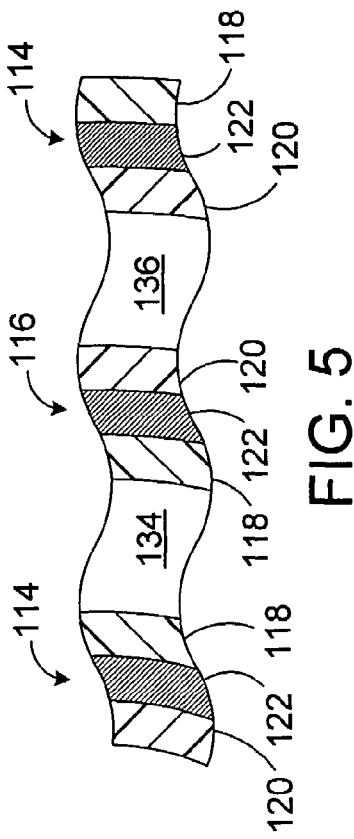
FIG. 5
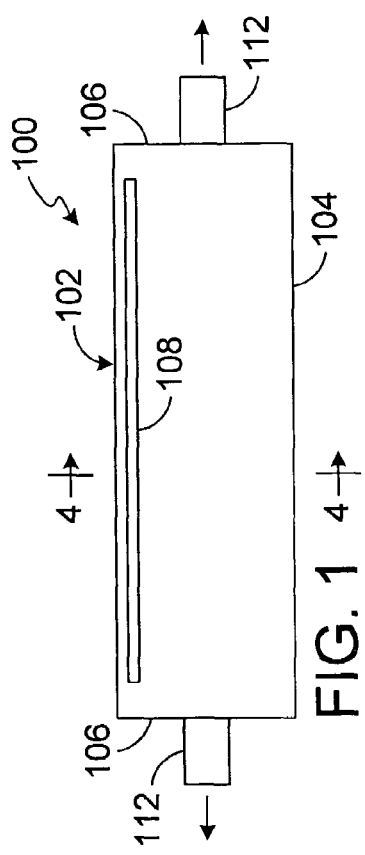
FIG. 1
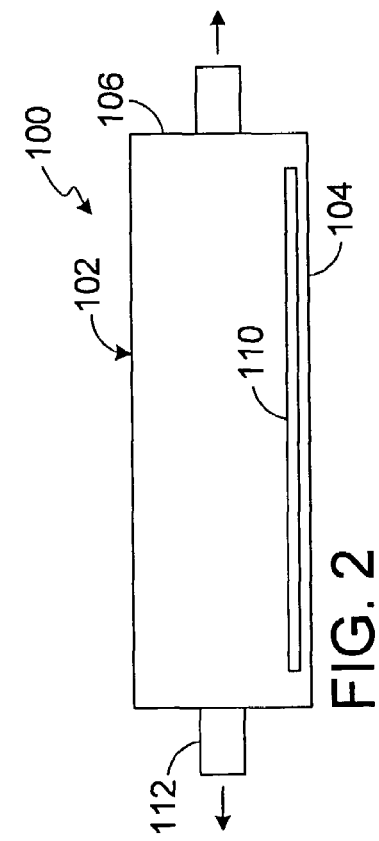
FIG. 2
FIG. 3

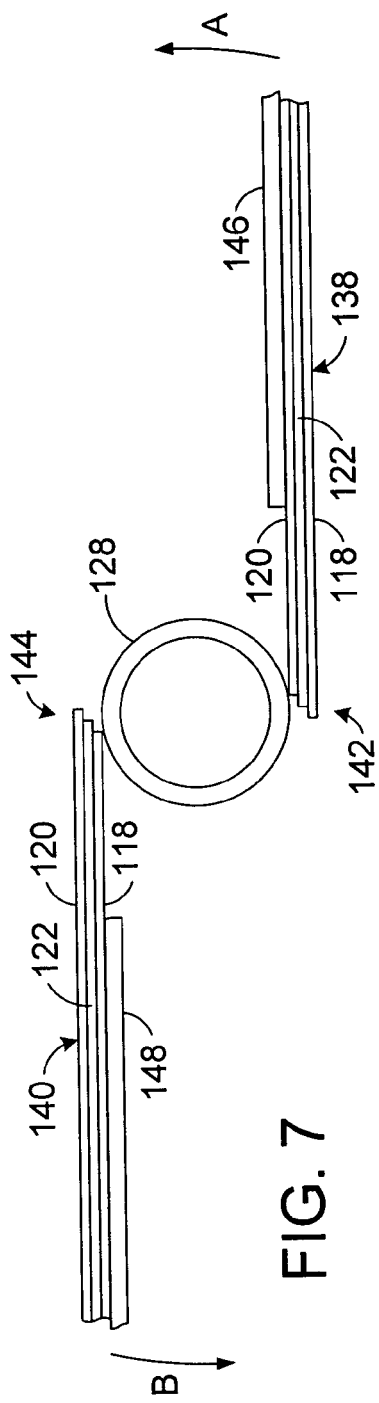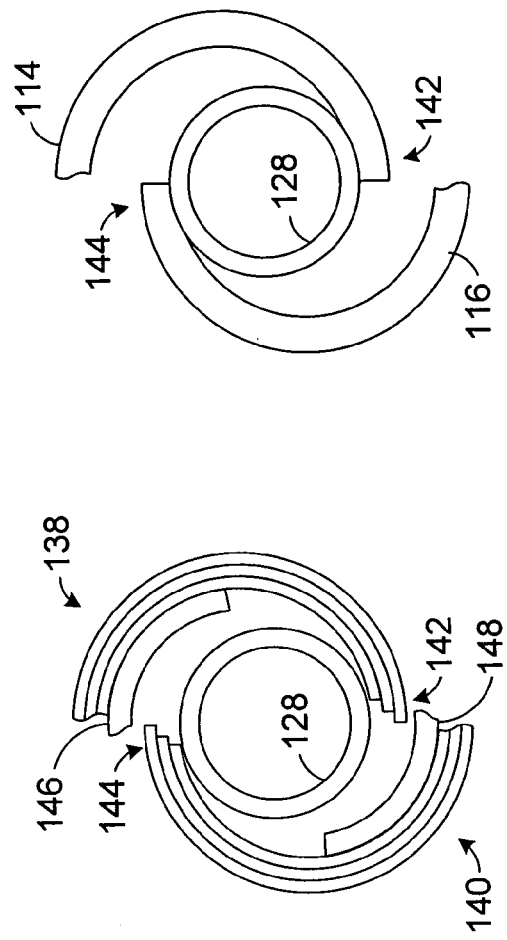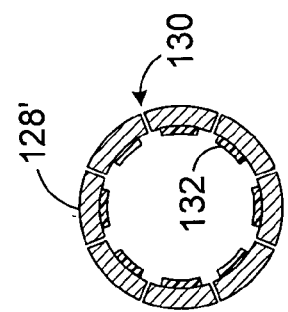

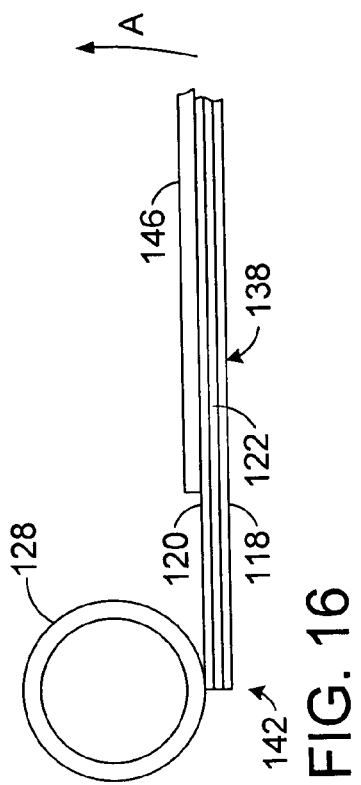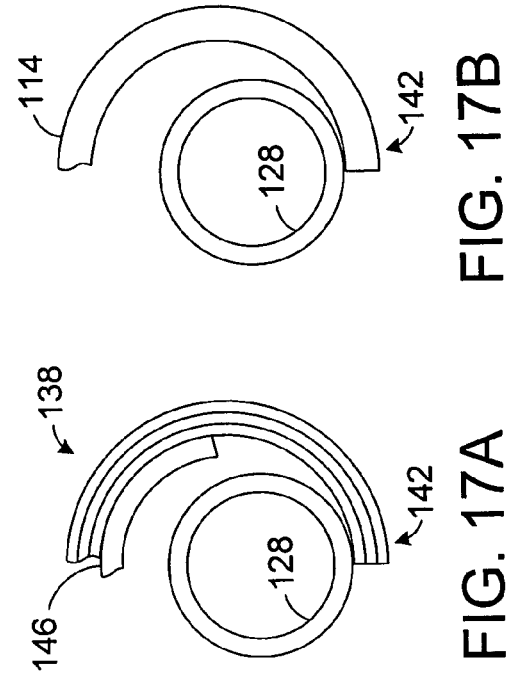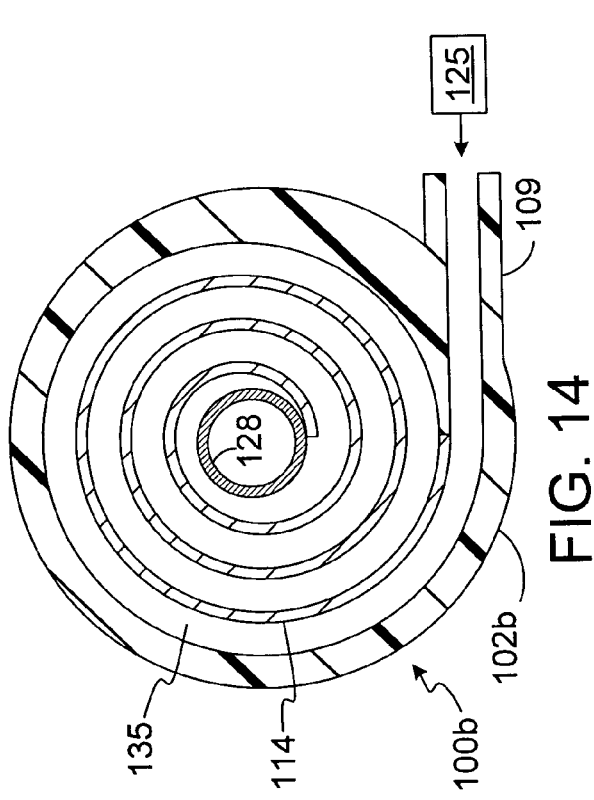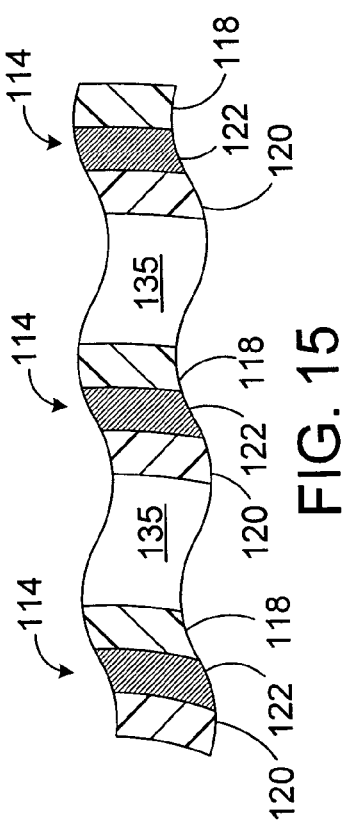

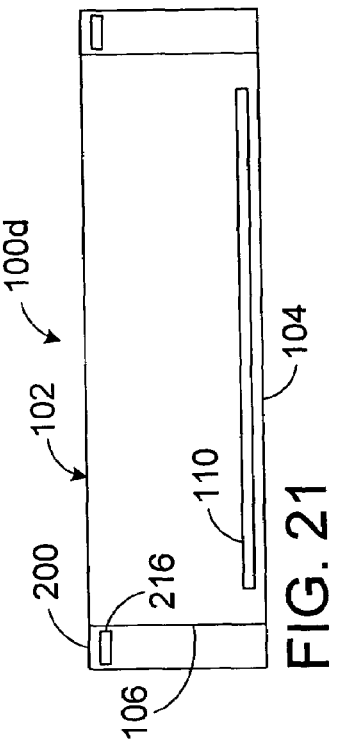
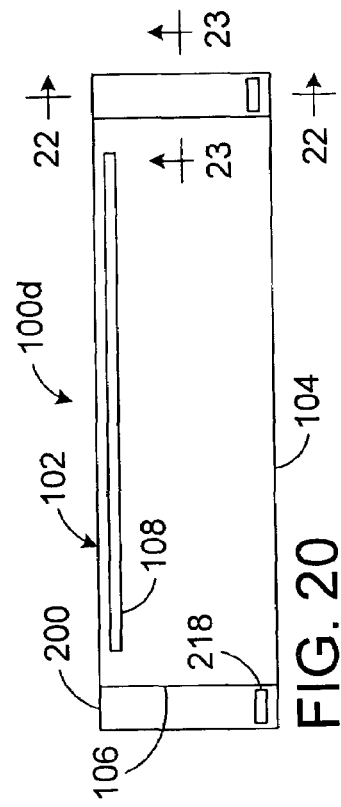
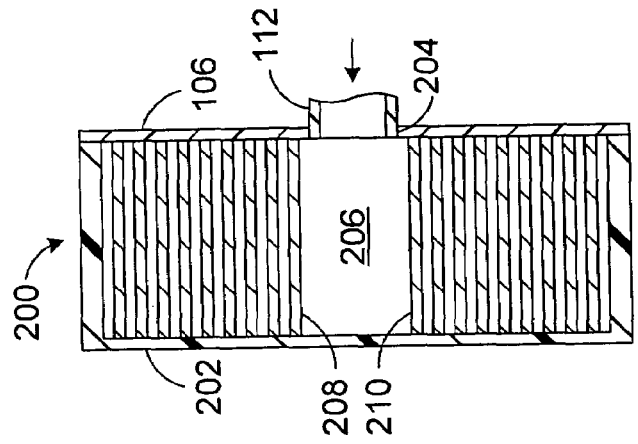
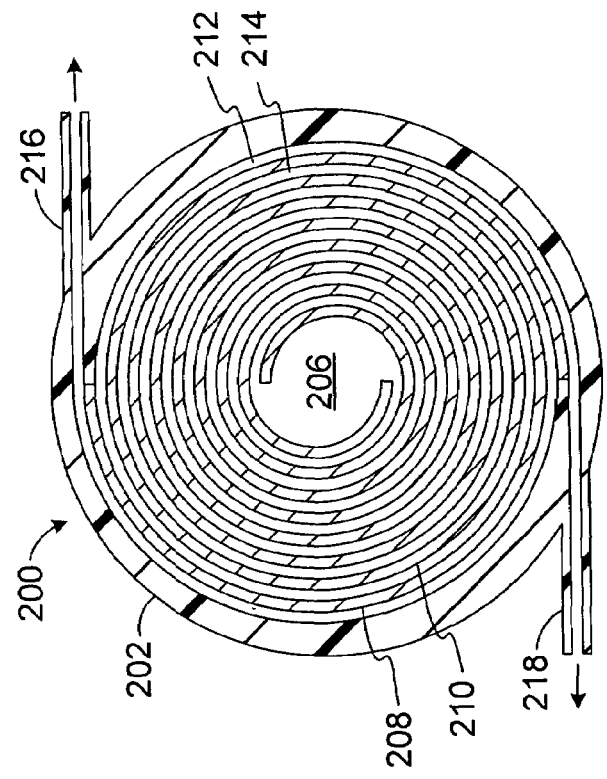
FIG. 21
FIG. 23
FIG. 20
FIG. 22

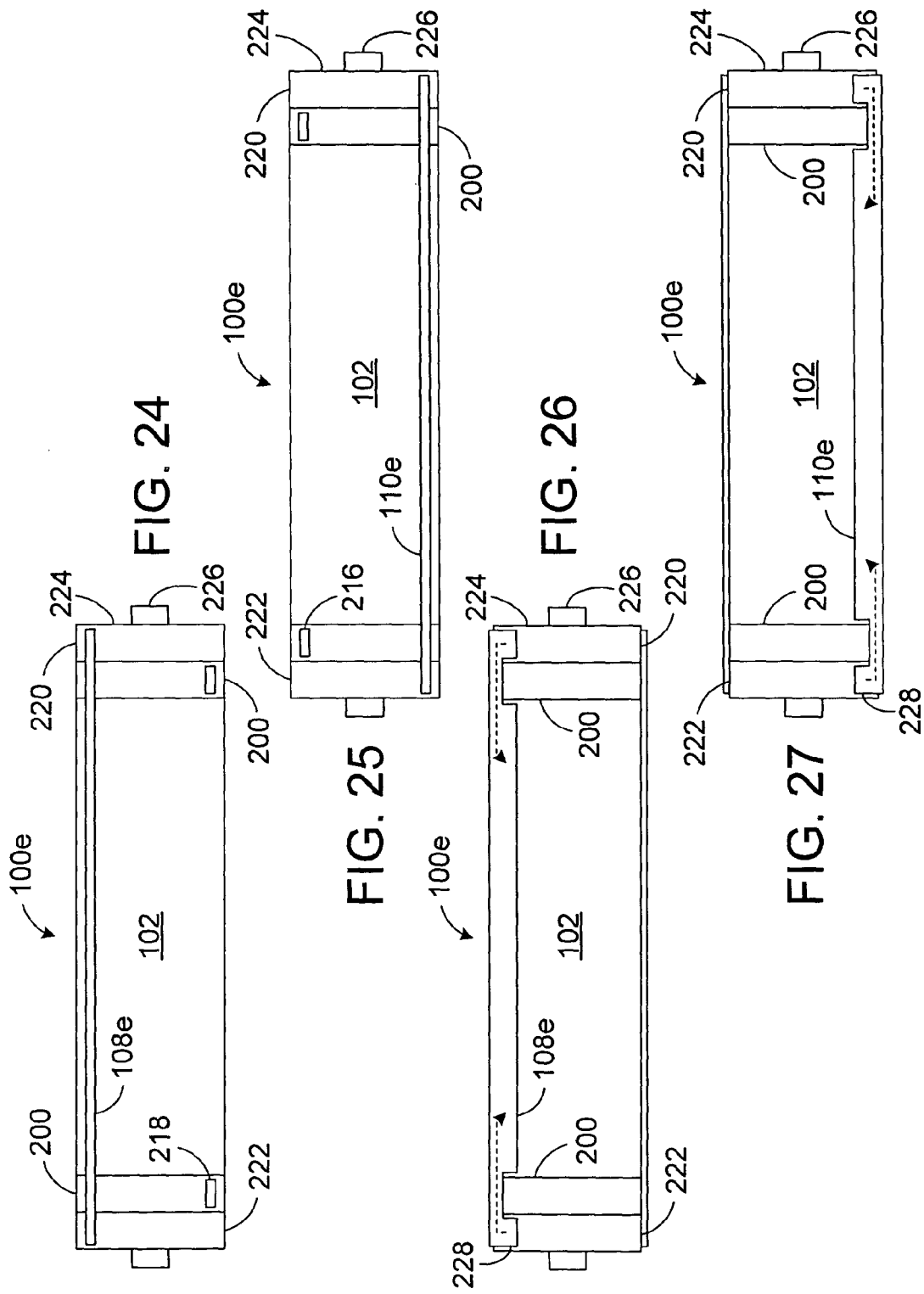

FUEL CELL ASSEMBLY

BACKGROUND OF THE INVENTIONS

1. Field of the Inventions

The present inventions are related to fuel cells.

2. Description of the Related Art

Fuel cells, which convert reactants (i.e. fuel and oxidant) into electricity and reaction products, are advantageous because they are not hampered by lengthy recharging cycles, as are rechargeable batteries, and are relatively small, lightweight and produce virtually no environmental emissions. Nevertheless, the inventor herein has determined that conventional fuel cells are susceptible to improvement. For example, the inventor herein has determined that it would be desirable to provide fuel cells that utilize the heat associated with the fuel cell reaction more efficiently than conventional fuel cells.

DESCRIPTION OF THE DRAWINGS

Detailed description of embodiments of the inventions will be made with reference to the accompanying drawings.

FIG. 1 is a front view of a fuel cell assembly in accordance with an embodiment of a present invention.

FIG. 2 is a rear view of the fuel cell assembly illustrated in FIG. 1.

FIG. 3 is a side view of a fuel cell system including the fuel cell assembly illustrated in FIG. 1.

FIG. 4 is a section view taken along line 4-4 in FIG. 1.

FIG. 5 is an enlarged view of a portion of the section view illustrated in FIG. 4.

FIG. 6 is a section view of a byproduct outlet tube in accordance with an embodiment of a present invention.

FIGS. 7, 8A and 8B are side views illustrating steps in a manufacturing process in accordance with a present invention.

FIG. 14 is a section view of a fuel cell assembly in accordance with an embodiment of a present invention.

FIG. 15 is an enlarged view of a portion of the section view illustrated in FIG. 14.

FIGS. 16, 17A and 17B are side views illustrating steps in a manufacturing process in accordance with a present invention.

FIG. 20 is a front view of a fuel cell assembly in accordance with an embodiment of a present invention.

FIG. 21 is a rear view of the fuel cell assembly illustrated in FIG. 20.

FIG. 22 is a section view taken along line 22-22 in FIG. 20.

FIG. 23 is a section view taken along line 23-23 in FIG. 20.

FIG. 24 is a front view of a fuel cell assembly in accordance with an embodiment of a present invention.

FIG. 25 is a rear view of the fuel cell assembly illustrated in FIG. 24.

FIG. 26 is a top view of the fuel cell assembly illustrated in FIG. 24.

FIG. 27 is a bottom view of the fuel cell assembly illustrated in FIG. 24.

DESCRIPTION OF THE EMBODIMENTS

Figure 11:
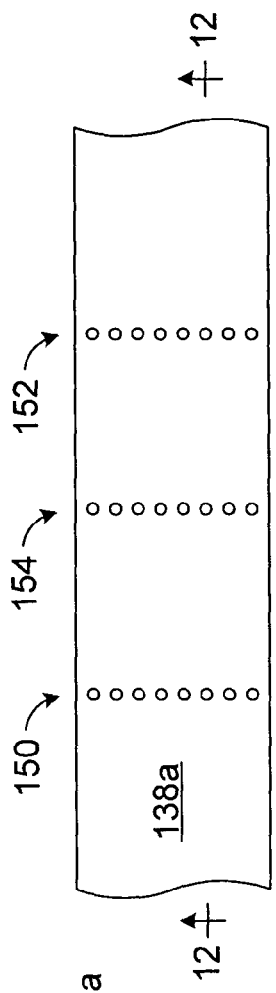
FIG. 11 is a plan view of fuel cell sheet in accordance with an embodiment of a present invention.

The following is a description of the best presently known modes of carrying out the inventions. This description is not to be taken in a limiting sense, but is made merely for the purpose of illustrating the general principles of the inventions. It is noted that detailed discussions of fuel cell structures that are not pertinent to the present inventions have been omitted for the sake of simplicity. The present inventions are also applicable to a wide range of fuel cell technologies and fuel cell systems, including those presently being developed or yet to be developed. For example, although various exemplary fuel cell system are described below with reference to solid oxide fuel cells ("SOFCs"), other types of fuel cells, such as proton exchange membrane ("PEM") fuel cells, are equally applicable to the present inventions.

As illustrated for example in FIGS. 1-5, a fuel cell assembly 100 in accordance with one embodiment of the present invention includes a housing 102 with a main wall 104, end walls 106, a fuel inlet 108, an oxidant inlet 110 and a pair of exhaust ports 112. Preferably, the housing 102 will also include insulation or be formed from material with insulative properties, and the inner surface will preferably have a coating of infrared reflector material. The exemplary assembly also includes pair of fuel cells 114 and 116, each of which has an anode 118 and a cathode 120 separated by an electrolyte 122. A fuel supply 124 supplies fuel, such as $H_2$ or hydrocarbon fuels such as $CH_4$, $C_2H_6$, $C_3H_8$, etc. to the anodes 118 of each fuel cell by way of the fuel inlet 108 and an oxidant supply 126 supplies oxidant, such as $O_2$ or ambient air, to the cathodes 120 of each fuel cell by way of the oxidant inlet 110. The present fuel cell assemblies include those in which the fuel supply 124 is replenishable or replaceable, as well as those in which all of the fuel that will be consumed by a fuel cell is initially present in the fuel supply. In those instances where ambient air is used, the oxidant supply may simply be a vent or a vent and fan arrangement. The oxidant is electrochemically ionized at the cathodes 120, thereby producing ions that diffuse through the conducting electrolytes 122 and react with the fuel at the anodes 118 to produce by-products ($CO_2$ and water vapor in the exemplary embodiment). The byproducts and any unused reactants are vented out of the housing 102 by way of a byproduct outlet tube 128 that extends to the exhaust ports 112. The byproduct outlet tube 128 also defines the longitudinal axis of the exemplary assembly 100.

The exemplary outlet tube 128 is formed from a gas permeable material such as porous yttria stabilized zirconia ("YSZ"). The YSZ used for the gas permeable outlet tube 128 will, in its green state, include relatively large YSZ grains/powder particles (e.g. 10 μm to 100 μm) and, in some instances finer grain powder (e.g. 0.5 μm), in an organic binding agent. Such material may be extruded under pressure into a tube when in the green state and will produce a porous tube when sintered. Platinum catalyst particles may also be embedded into the green YSZ material. Alternatively, the exemplary byproduct outlet tube 128' illustrated in FIG. 6, which may be used in any of the fuel cell assemblies disclosed herein, is formed from an impermeable material, such as YSZ, and includes a plurality of apertures 130 through which the byproducts and any unused reactants will pass. In either case, portions of the inner surfaces of the byproduct outlet tubes 128 and 128' may be provided with a catalytic combustor material 132 (FIG. 6), such as platinum, in order to insure that any unused fuel is consumed prior to reaching the exhaust ports 112.

Current collectors (not shown) are connected to the anodes 118 and cathodes 120. The anodes 118 may be connected to one another in series or parallel, as may the cathodes 120. The preferred connection scheme depends on the power requirements of the load. A controller may be provided to monitor and control the operations of the exemplary fuel cell assembly 100 as well as the fuel and oxidant supplies 124 and 126, which together define a fuel cell system. Alternatively, the operation of the fuel cell system may be controlled by the host (i.e. power consuming) device.

The fuel cells 114 and 116 in the exemplary fuel cell assembly 100 illustrated in FIGS. 1-5 are substantially coextensive and arranged such that the anodes 118 of each cell face one another (or face a portion of the housing main wall 104) with fuel passages 134 defined therebetween, while the cathodes 120 face one another (or face a portion of the housing main wall) with oxidant passages 136 defined therebetween. Referring more specifically to FIGS. 4 and 5, the fuel cells 114 and 116 are arranged such that the fuel, oxidant and reaction byproducts travel from the outer region of the fuel cell assembly 100 to the inner region of the assembly, and complete one or more revolutions around the perimeter of the inner region of the assembly, as they travel through the fuel and oxidant passages 134 and 136 from the fuel and oxidant inlets 108 and 110 to the byproduct outlet tube 128. The reactant and byproduct flow through the fuel and oxidant passages 134 and 136 will work to drive heat inwardly (due to convective heat transfer) and counter the tendency of the heat to move outwardly (due to conductive and radiative heat transfer). Retaining heat in this manner reduces the thermal losses of the overall assembly and creates an environment that facilitates self-sustaining fuel cell reactions.

In the exemplary implementation illustrated in FIGS. 1-5, the inner region of the assembly 100 is defined by the byproduct outlet tube 128. The fuel cells 114 and 116 are preferably both spiral shaped and complete a plurality of revolutions (typically about 1 to 50 or more revolutions) around the byproduct outlet tube 128. As such, the fuel (and associated byproducts) and oxidant (and associated byproducts) travel through respective spiral shaped fuel and oxidant passages 134 and 136. The reactants and byproducts will, accordingly, move continuously closer to the byproduct outlet tube 128 as they move away from the upstream ends of the fuel cells 114 and 116, i.e. the ends adjacent to the inlets 108 and 110, until they reach the downstream ends of the fuel cells, i.e. the ends adjacent to the byproduct outlet tube. The fuel cell ends adjacent to the byproduct outlet tube 128 are identified by reference numerals 142 and 144 in FIGS. 7-8B.

As illustrated above, the spiral-shaped fuel cells 114 and 116 (note FIG. 4) together perform the function of converting reactants (i.e. fuel and oxidant) into electricity and byproducts and directing all of the reactants and byproducts radially inwardly from the outer portion of the housing interior (i.e. the portion associated with the inlets 108 and 110) to the inner portion of the housing interior (i.e. the portion associated with the byproduct outlet tube 128) while the reactants and byproducts travel at least once around the longitudinal axis of the housing 102 (note FIG. 4), as the reactants are being converted into electricity and byproducts, such that all of the byproducts and any unused reactants that exit the fuel cell assembly exit (note exhaust ports 112) after passing through the inner portion of the housing interior. This function is also performed by the fuel cell 114a (described below with reference to FIG. 10) and the fuel cell 114 (in the orientation described below with reference to FIG. 14).

It should be noted here that the present inventions are not limited to fuel cells 114 and 116 with the substantially circular spiral shaped configuration (when viewed from the side) illustrated in FIG. 5. For example, fuel cells that have a substantially elliptical spiral shaped configuration may be employed. The present invention are also not limited to curvilinear shapes such as circles and ellipses. Linear shapes, such a square, rectangular or octagon based spiral shaped, may also be employed so long as the reactant passages direct the byproducts and unused reactants around and to the inner region of the fuel cell assembly.

Although the materials, dimensions, and configuration of the exemplary fuel cells 114 and 116 will depend upon the type of fuel cell (e.g. SOFC, PEM, etc.) and intended application, and although the present inventions are not limited to any particular materials, dimensions, configuration or type, exemplary fuel cells are described below for fuel cell assemblies which range from relatively small fuel cell assemblies that are intended for use in applications such as portable electronic device to medium sized fuel cell assemblies that are intended for use with larger electrical devices. The exemplary fuel cells are preferably between about 50 µm and 1 mm thick, although thinner and thicker fuel cells may be employed as applications so require. The fuel and oxidant passages 134 and 136 are about 25 µm to 2 mm thick, while the width of the fuel cells 114 and 116 will typically be about 10 mm to 300 mm from end wall 106 to end wall 106. The anodes are preferably a porous, ceramic and metal composite (also referred to as "cermet") film. Suitable ceramics include samaria-doped ceria ("SDC"), gandolinia-doped ceria (GDC) and YSZ and suitable metals include nickel and copper. The cathodes are preferably a porous ceramic film. Suitable ceramic materials include samarium strontium cobalt oxide ("SSCO"), lanthanum strontium manganate, bismuth copper substituted vanadate. The electrolytes are preferably a non-porous ceramic film, such as SDC, GDC or YSZ.

The exemplary fuel cells 114 and 116 may also be formed in a variety of ways. Turning to FIGS. 7-8B, the exemplary fuel cells 114 and 116 may be formed from generally planar fuel cells sheets 138 and 140. The sheets 138 and 140, each of which includes an anode 118, cathode 120 and electrolyte 122, are preferably manufactured by a tape calendaring process that joins separate anode, cathode and electrolyte films into a single sheet. The current collectors are typically part of the anode and cathode sheets. Other processes, such as casting, lamination, transfer printing, shadow masking and spraying, extrusion printing, and extrusion printing with embossing, may also be employed. The downstream ends 142 and 144 of the fuel cells sheets 138 and 140 are secured to the byproduct outlet tube 128 through the use of solvents such as isopropyl alcohol. The solvent softens the portions of the materials that are to be joined so that the materials will fuse when brought into intimate contact with one another when the fuel cell sheets are still in the flexible, green state. The solvent will eventually evaporate. Sacrificial filler sheets 146 and 148, which prevent the fuel cell sheets from sticking to one another, may also be provided. It should also be noted here that the down stream ends 142 and 144 of the fuel cell sheets 138 and 140 may be tapered in the manner illustrated in FIGS. 7 and 8A, if desired, in order to increase the amount of surface area in contact with the outlet tube 128. Ends without such tapering are shown in FIGS. 16-17B.

Next, the fuel cell sheets 138 and 140 are wound around the byproduct outlet tube 128 in the direction of arrows A and B (FIG. 7) until they are arranged in the spiral orientation illustrated in FIGS. 4 and 8A. This may be accomplished by applying force to the fuel cell sheets 138 and 140 themselves, by rotating the byproduct outlet tube 128 about its longitudinal axis, or some combination thereof, while the sheets are in the green state. The sheets 146 and 148 (and byproduct outlet tube 128) will then be fired in order to burn out the organic solvents and binders and sinter together the ceramic materials. This sets the sheets in the spiral orientation illustrated in FIGS. 4 and 8B, thereby creating the anode and cathode arrangement that defines the fuel cells 114 and 116, and burns off the sacrificial filler sheets 146 and 148. The fuel cells 114 and 116 and byproduct outlet tube 128 may then be placed in the housing 102.

Figure 9:
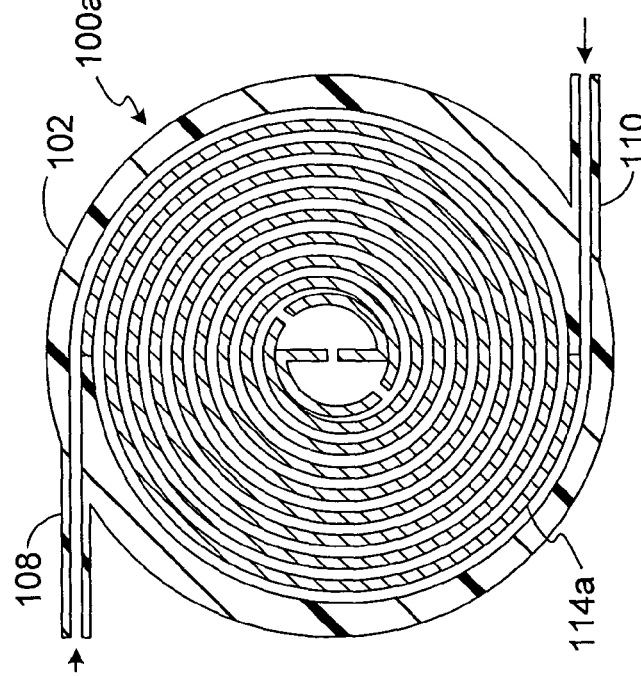
FIG. 9 is a section view of a fuel cell assembly in accordance with an embodiment of a present invention.
Figure 10:
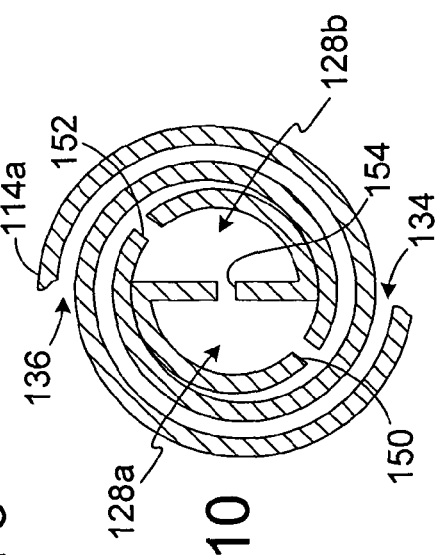
FIG. 10 is an enlarged view of a portion of the section view illustrated in FIG. 9.

Another exemplary fuel cell assembly, which is generally represented by reference numeral 100a, is illustrated in FIGS. 9 and 10. The fuel cell assembly 100a is substantially similar to assembly 100 and similar elements are represented by similar reference numerals. Here, however, the fuel cell assembly includes a single fuel cell 114a that is arranged in such a manner that portions the anode 118 (FIG. 12) face one another (or face a portion of the housing main wall 104) with fuel passages 134 defined therebetween, while portions of the cathode 120 (FIG. 12) face one another (or face a portion of the housing main wall) with oxidant passages 136 defined therebetween. The fuel, oxidant and reaction byproducts will travel from the outer region of the fuel cell assembly 100a to the inner region of the assembly, and complete one or more revolutions around the inner region of the assembly, as they travel through the fuel and oxidant passages 134 and 136 from the fuel and oxidant inlets 108 and 110 to the inner region of the assembly. More specifically, the fuel and oxidant passages 134 and 136 in the exemplary fuel cell assembly 100a have the same spiral shape, and provide the same thermal efficiency benefits, as they do in the fuel cell assembly 100.

The exemplary fuel cell assembly 100a illustrated in FIGS. 9 and 10 also lacks the byproduct outlet tube 128 that is included in the exemplary assembly 100. Instead, the exemplary fuel cell assembly 100a includes a pair of byproduct outlet regions 128a and 128b which are defined by portions of the fuel cell 114a at the inner region of the assembly, and are connected to the exhaust ports 112 on the housing 102. The respective portions of the fuel cell 114a that define the byproduct outlet regions 128a and 128b also include oxidant passage apertures 150, fuel passage apertures 152 and mixing apertures 154 (FIG. 10). The oxidant and fuel passage apertures 150 and 152 allow the byproducts (and any unused reactants) from the fuel and oxidant passages 134 and 136 to enter the byproduct outlet regions 128a and 128b. The mixing apertures 154 allow the contents of the byproduct outlet regions 128a and 128b to mix so that any unused reactants can be properly combusted. To that end, catalytic combustor material may be positioned within the byproduct outlet regions 128a and 128b.

Figure 12:
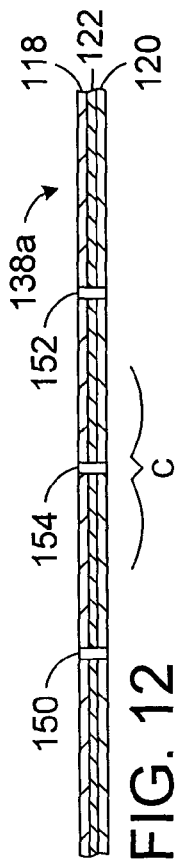
FIG. 12 is a section view taken along line 12-12 in FIG. 11.
Figure 13A:
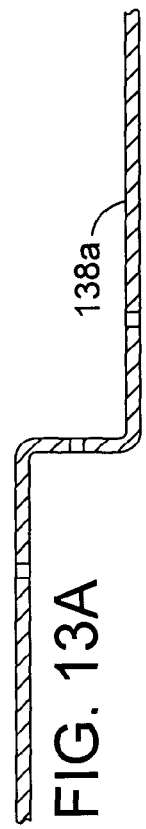
FIGS. 13A and 13B are section and side views, respectively, illustrating steps in a manufacturing process in accordance with a present invention.
Figure 13B:
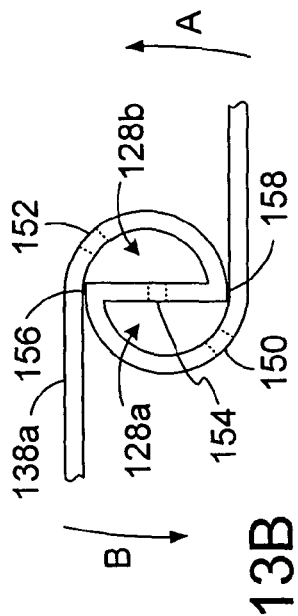

With respect to manufacture, the exemplary fuel cell 114a may be formed from the generally planar fuel cell sheet 138a illustrated in FIGS. 11 and 12, which includes an anode 118, cathode 120 and electrolyte 122, and is manufactured in the manner described above. The apertures 150-154 may be punched into the fuel cell sheet 138a when the sheet is still in the green state. Sacrificial filler sheets (not shown) may also be provided in the manner described above. Turning to FIGS. 13A and 13B, the green fuel cell sheet 138a is twisted, first into the orientation illustrated in FIG. 13A and then into the orientation illustrated in FIG. 13B. This may be accomplished by, for example, engaging the fuel cell sheet 138a in area C (FIG. 12) and rotating area C about the axis defined by the line of mixing apertures 154. The fuel cell sheet 138a will then be bonded to itself at positions 156 and 158 in order to seal the byproduct outlet regions 128a and 128b. The portions of the fuel cell sheet 138a on opposite sides of the byproduct outlet regions 128a and 128b will then be wound byproduct outlet regions in the direction of arrows A and B (FIG. 13B) until they are arranged in the spiral orientation illustrated in FIGS. 9 and 10. This may be accomplished by applying force to the fuel cell sheet portions themselves, by rotating the byproduct outlet regions 128a and 128b about their combined longitudinal axis, or some combination thereof, while the sheet 138a is in the green state. The fuel cell sheet 138a will then be fired in order to burn out the organic solvents and binders and sinter together the ceramic materials. This sets the sheet 138a in the spiral orientation illustrated in FIGS. 9 and 10, thereby creating the fuel cell 114a, and also burns off the sacrificial filler sheets. The fuel cell 114a may then be placed in the housing 102.

Another exemplary fuel cell assembly, which is generally represented by reference numeral 100b, is illustrated in FIGS. 14 and 15. The fuel cell assembly 100b is substantially similar to assembly 100 and similar elements are represented by similar reference numerals. Here, however, the fuel cell assembly 100b is a single chamber assembly that includes a single fuel cell 114. The fuel cell 114 is arranged in such a manner that the anode 118 and cathode 120 face one another (or face a portion of the housing main wall) with a combined fuel/oxidant passage 135 defined therebetween. The fuel, oxidant and reaction byproducts will travel from the outer region of the fuel cell assembly 100b to the inner region of the assembly, and complete one or more revolutions around the inner region of the assembly, as they travel through the fuel/oxidant passage 135 from a combined fuel/oxidant inlet 109 to the inner region. More specifically, the fuel/oxidant passage 135 has a spiral shape, and provides the same thermal efficiency benefits, as the individual fuel and oxidant passages 134 and 136 do in the fuel cell assembly 100. The reaction byproducts, and any unused reactants, are vented out of the housing 102b by way of a byproduct outlet tube 128 that extends to the housing exhaust ports 112 (FIG. 1). A combined fuel/oxidant supply 125 may be connected to the fuel/oxidant inlet 109.

The exemplary fuel cell 114 in the assembly 100b is manufactured in substantially the same manner as the fuel cell 114 in the assembly 100. More specifically, and referring to FIG. 16, the downstream end 142 of the generally planar fuel cell sheet 138 is secured to the byproduct outlet tube 128 in the manner described above when the sheet is still in the green state. A sacrificial filler sheet 146 is also be provided to prevent sticking. Next, the fuel cell sheet 138 is wound around the byproduct outlet tube 128 in the manner described above until it is arranged in the spiral orientation illustrated in FIGS. 14 and 17A. The fuel cell sheet 138 will then be fired and set in the spiral orientation illustrated in FIGS. 14 and 17B, thereby creating the fuel cell 114. The sacrificial filler sheet 146 will also burn off. The fuel cell 114 and byproduct outlet tube 128 may then be placed in the housing 102b.

The exemplary fuel cells 114, 114a and 116 that are described above with reference to FIGS. 1-17B are open at their longitudinal ends, i.e. the right and left side ends when the fuel cells are in the orientation illustrated in FIG. 1. As such, the housings 102 and 102b include end walls 106 and the end walls hold the reactants and byproducts in the fuel, combined fuel/oxidant, and oxidant passages 134, 135 and 136. The exemplary fuel cell assembly 100c illustrated in FIG. 18 includes its own end walls 160 (only one visible in FIG. 18) that are formed from portions of the fuel cell electrolytes 122c. The corresponding housing 102c, which is formed from the same material as the electrolytes 122c, also forms a small portion of the end walls 160.

Figure 19A:
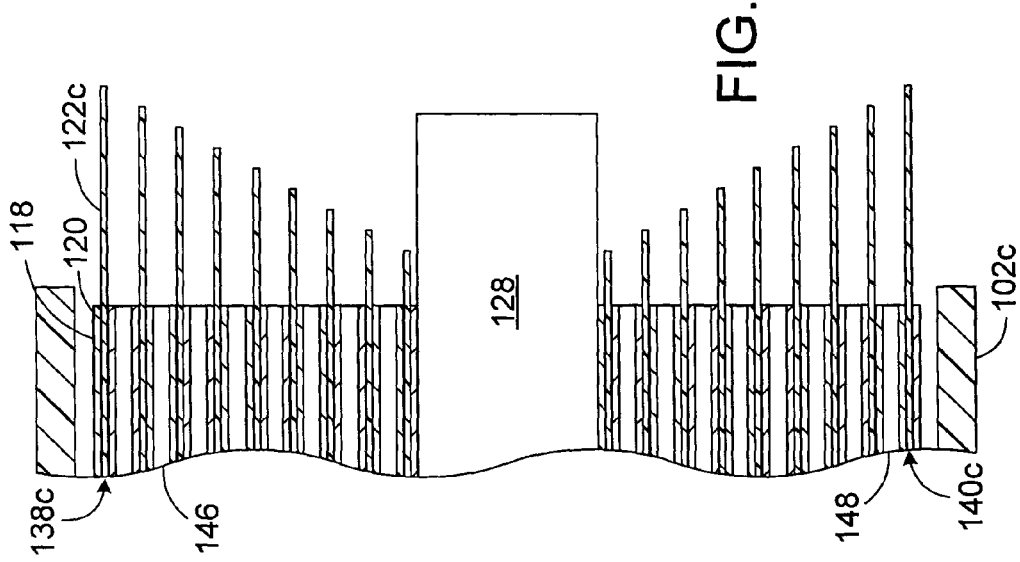
FIGS. 19A, 19B and 19C are partial section views illustrating steps in a manufacturing process in accordance with a present invention.
Figure 19C:
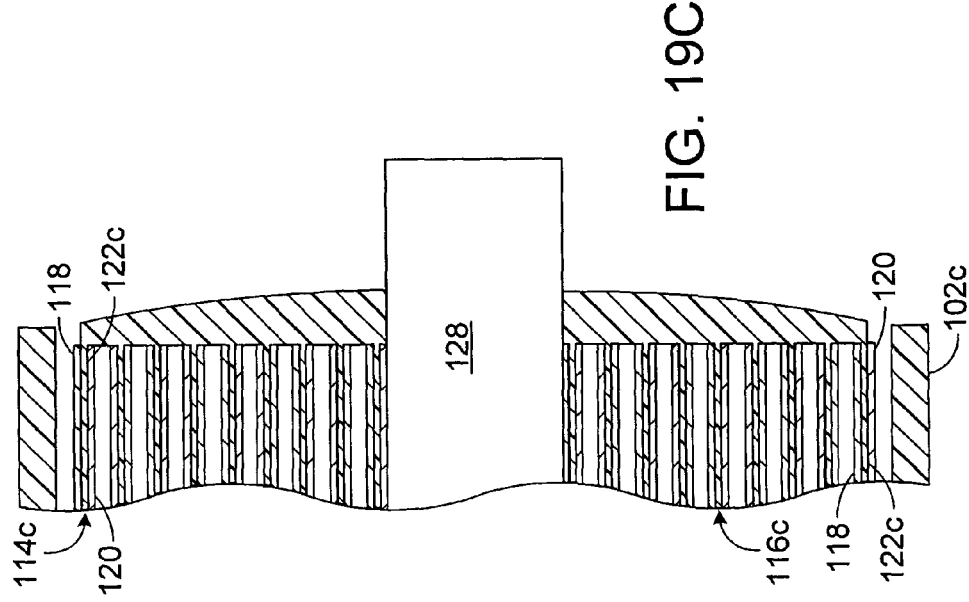
Figure 19B:
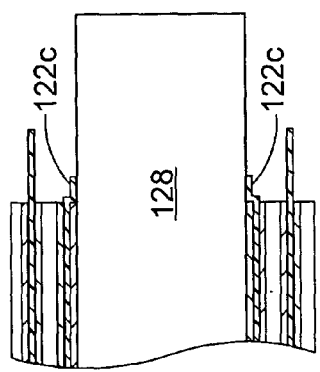

More specifically, and referring to FIGS. 19A-19C, the electrolytes 122c in the fuel cell sheets 138c and 140c are configured such that, after the sheets have been positioned in their final orientation (FIG. 19A), which is similar to that illustrated in FIG. 4, portions of the electrolytes will extend longitudinally beyond the anodes 118 and cathodes 120. The distance from the free edge of the electrolytes 122c to the anodes 118 and cathodes 120 increases with distance from the byproduct outlet tube 128. The extra electrolyte material allows the electrolytes 122c to be radially compressed or otherwise bent towards the byproduct outlet tube 128 (FIG. 19B) while the fuel cell sheets 138c and 140c are still in the green state. The green electrolytes 122c may be treated with a solvent, if necessary, in order to increase their flexibility. During the firing process, the bent portions of the electrolytes 122c will merge together to form the end walls 160 as the fuel cells 114c and 116c are being created.

Turning to the housing 102c, the housing is preferably formed from relatively thick lengths of electrolyte material that are respectively secured to the ends of the fuel cell sheets 138c and 140c prior to winding the sheets around the byproduct outlet tube 128. This material is wound around the fuel cell sheets 138c and 140c after the fuel cell sheets have been wound around the byproduct outlet tube 128. The regions of the electrolyte material that will define the fuel and oxidant inlets will have preformed openings, although some machining may be required after firing. As illustrated in FIG. 19C, the small portion of the electrolyte material that will ultimately form the housing 102c extends beyond the longitudinally beyond the anodes 118 and cathodes 120. This small portion of the electrolyte material will be treated with a solvent (if necessary) and radially compressed or otherwise bent towards the byproduct outlet tube 128 until it meets the bent portions of the electrolytes 122c. The structure will then be fired to form the exemplary fuel cell assembly 100c illustrated in FIG. 18.

Figure 18:
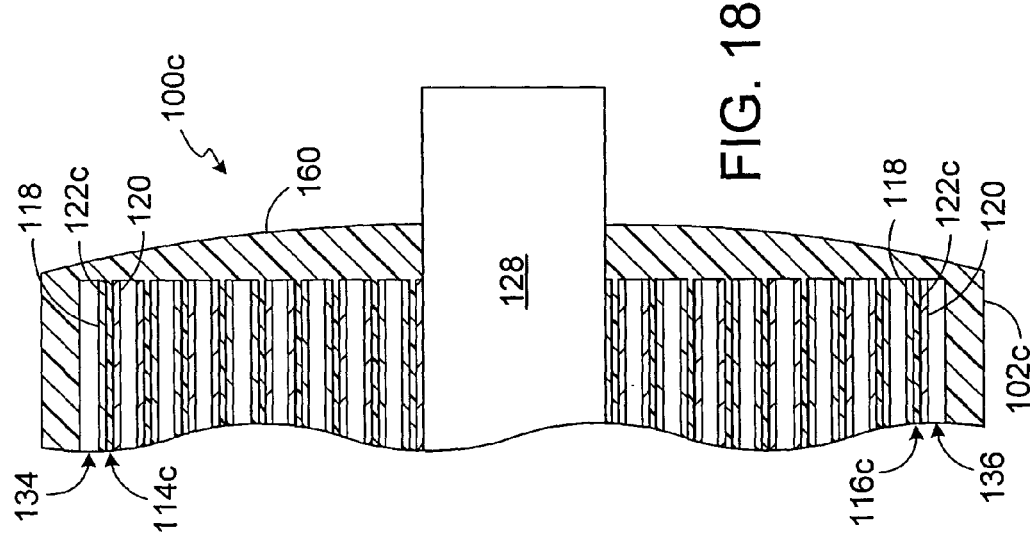
FIG. 18 is a partial section view of a fuel assembly in accordance with an embodiment of a present invention.

One advantage of forming a fuel cell assembly in the manner illustrated in FIGS. 18-19C is that it provides an integrated, and cost reducing, manufacturing process wherein the housing and reactant manifolds (here, the fuel and oxidant passages) are formed at the same time as the fuel cells themselves.

The exemplary fuel cell assemblies described above may be provided with one or more heat exchangers to further improve efficiency. Turning to FIGS. 20-23, in one exemplary implementation, a fuel cell assembly 100d, which is substantially identical to fuel cell assembly 100, is provided with a pair of heat exchangers 200. The heat exchangers 200 are respectively mounted adjacent to the housing end walls 106. The exemplary heat exchangers 200 each include a housing 202, which is preferably formed from an insulating material that has a coating of infrared reflector material on the inner surface, with an inlet 204 that is adapted to mate with the fuel cell assembly exhaust ports 112 and an inner region 206 which receives the fuel cell exhaust. Alternatively, insulation may be placed on the outer surface of the heat exchanger housings 202. The exemplary heat exchangers 200 also have a "Swiss roll" configuration. A pair of spiral walls 208 and 210 define a pair of spiral exhaust paths 212 and 214. The fuel cell exhaust will travel from the inner region 206, through the spiral exhaust paths 212 and 214, to the outlets 216 and 218 of each heat exchanger 200. As the exhaust spirals around the inner region, heat will be transferred into the fuel cell housing 102 by way of the end walls 106 and, to that end, the end walls 106 should be formed from material with good heat transfer properties in those fuel cell assembly implementations that include the heat exchangers 200.

In addition to supplying heat to the fuel cell assembly housing, one or more heat exchangers may also be used to pre-heat the reactants before they enter the housing. As illustrated for example in FIGS. 24-27, an exemplary fuel cell assembly 100e, which is substantially identical to fuel cell assembly 100d, is provided with fuel and oxidant heaters 220 and 222. The fuel and oxidant heaters 220 and 222 are substantially identical to one another and to the heat exchangers 200. More specifically, the fuel and oxidant heaters 220 and 222 each include a housing 224, which is preferably formed from an insulating material that has a coating of infrared reflector material on the inner surface. The fuel and oxidant heaters 220 and 222 also each include inlets 226, which are respectively adapted to mate with fuel and oxidant sources, and outlets 228, as well as the above-described inner regions, spiral walls and paths. The fuel and oxidant travels from the inner regions, through the spiral paths, to the outlets 228. As the fuel and oxidant spirals around the inner regions of the heaters 220 and 222, heat from the fuel cell exhaust will be transferred to the fuel and oxidant entering the fuel cell assembly 100e by way of the heat exchangers 200, which are also used to supply heat to the housing 102. To that end, the walls of the heat exchangers 200 adjacent to the fuel and oxidant heaters 220 should be formed from material with good heat transfer properties in those fuel cell assembly implementations that include the fuel and oxidant heaters.

Figure 28:
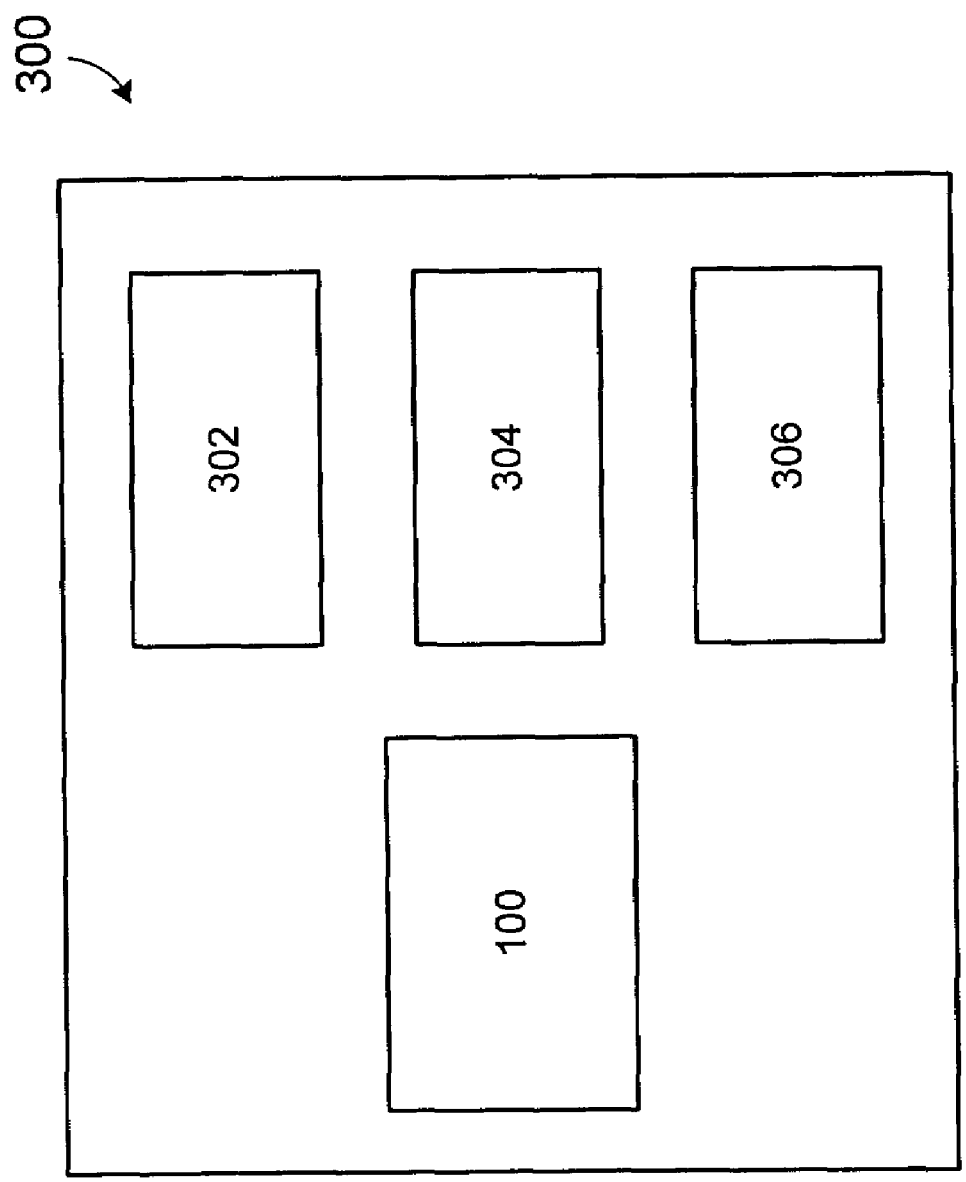
FIG. 28 of a system or device in accordance with one embodiment of a present invention.

The present inventions also include a wide variety of electrically powered devices and systems including, but not limited to electronic devices (e.g. notebook computers, personal digital assistants, digital cameras, portable telephones and games), vehicles, homes, relatively small portable power generators, such as those used for camping, and relatively large portable power generators used in commercial applications, which are powered at least in part by one of the aforementioned fuel cell systems. Turning to FIG. 28, an exemplary device or system 300 includes a fuel cell assembly 100 and various power consuming apparatus 302, 304 and 306.

Although the present inventions have been described in terms of the preferred embodiments above, numerous modifications and/or additions to the above-described preferred embodiments would be readily apparent to one skilled in the art. It is intended that the scope of the present inventions extend to all such modifications and/or additions.

I claim:
1. A fuel cell assembly, comprising:
   a housing defining a longitudinal axis and an interior, the housing interior having an outer portion and an inner portion that is located radially inward of the outer portion; and
   at least one spiral shaped fuel cell, including an anode electrode and a cathode electrode, that defines a fuel path;
   wherein the fuel path extends more than once around the longitudinal axis and has an upstream end associated with the outer portion of the housing interior and a downstream end associated with the inner portion of the housing interior; and
   wherein the fuel path is in the form of an empty hollow region defined by two radially spaced electrode surfaces.

2. A fuel cell assembly as claimed in claim 1, wherein the housing includes at least one housing inlet associated with the upstream end of the fuel path and at least one exhaust port operably connected to the downstream end of the fuel path.

3. A fuel cell assembly as claimed in claim 1, wherein the at least one fuel cell comprises first and second fuel cells, the fuel cell assembly further comprising:
an oxidant path that extends more than once around the longitudinal axis and has an upstream end associated with the outer portion of the housing interior and a downstream end associated with the inner portion of the housing interior.

4. A fuel cell assembly as claimed in claim 3, wherein the housing includes a fuel inlet associated with the upstream end of the fuel path and an oxidant inlet associated with the upstream end of the oxidant path.

5. A fuel cell assembly as claimed in claim 1, wherein the fuel path extends at least a plurality of times around the longitudinal axis of the housing.

6. A fuel cell assembly as claimed in claim 1, further comprising:
a byproduct outlet region located within the inner portion of the housing interior.

7. A fuel cell assembly as claimed in claim 6, wherein the byproduct outlet region comprises first and second byproduct outlet regions.

8. A fuel cell assembly as claimed in claim 6, wherein the fuel path extends more than once around the byproduct outlet region.

9. A fuel cell assembly as claimed in claim 1, wherein the housing includes an exhaust port operably connected to the inner portion of the housing interior, the fuel cell assembly further comprising:
a heat exchanger associated with the housing and operably connected to the exhaust port.

10. A fuel cell assembly as claimed in claim 1, further comprising:
at least one reactant supply operably connected to the upstream end of the fuel path.

11. A fuel cell assembly as claimed in claim 1, wherein the fuel path defines a spiral shape.

12. A fuel cell assembly as claimed in claim 11, wherein the fuel path defines a substantially curvilinear spiral shape.

13. A fuel cell assembly, comprising:
a housing including an inlet and an exhaust port located radially inward of the inlet;
an exhaust region connected to the housing exhaust port and defining a perimeter; and
at least one anode and cathode arrangement having a spiral shape that extends outwardly of and more than once around the perimeter of the exhaust region and defines a reactant path having an outlet end associated with the exhaust region and an inlet end connected to the housing inlet;
wherein the housing and the anode and cathode arrangement are constructed and arranged relative to one another such that the only reactant flow direction is radially inward toward the housing exhaust port that is located radially inward of the housing inlet.

14. A fuel cell assembly as claimed in claim 13, further comprising:
a byproduct outlet region that defines the exhaust region.

15. A fuel cell assembly as claimed in claim 13, wherein the exhaust region is defined by a portion of the at least one anode and cathode arrangement.

16. A fuel cell assembly as claimed in claim 13,
wherein the at least one anode and cathode arrangement comprises first and second anode and cathode arrangements that define substantially coextensive spiral shapes;
wherein the inlet comprises first and second inlets; and
wherein the exhaust port is located radially inward of the first and second inlets.

17. A fuel cell assembly as claimed in claim 13, wherein the at least one anode and cathode arrangement comprises an anode, a cathode and an electrolyte.

18. A fuel cell assembly, comprising:
a housing defining a longitudinal axis and an interior and having an exhaust port, the housing interior having an outer portion and an inner portion that is located radially inward of the outer portion and is associated with the exhaust port; and
means for converting reactants into electricity and byproducts and directing all of the reactants and byproducts radially inward from the outer portion of the housing interior to the inner portion of the housing interior while the reactants and byproducts travel at least once around the longitudinal axis, as the reactants are being converted into electricity and byproducts, such that all of the byproducts and any unused reactants that exit the fuel cell assembly exit after passing through the inner portion of the housing interior.

19. A fuel cell assembly as claimed in claim 18, further comprising:
a heat exchanger associated with the housing and operably connected to the exhaust port.

20. A fuel cell assembly as claimed in claim 18, wherein the housing includes a fuel inlet associated with the outer portion of the housing interior and an oxidant inlet associated with the outer portion of the housing interior.

21. A fuel cell assembly as claimed in claim 18, further comprising:
at least one reactant supply operably connected to the means for converting reactants into electricity and byproducts.

22. A fuel cell assembly as claimed in claim 1, wherein the fuel path is adjacent to the anode electrode and the cathode electrode.

23. A fuel cell assembly as claimed in claim 1, wherein the fuel path is in the form of an empty hollow region defined by two radially spaced anode electrode surfaces.

24. A fuel cell assembly as claimed in claim 1, wherein the fuel path is in the form of an empty hollow region defined by an anode electrode surface and a radially spaced cathode electrode surface.

25. A fuel cell assembly as claimed in claim 1, wherein
the housing includes at least one housing inlet associated with the upstream end of the fuel path; and
the housing inlet is oriented such fuel exits the housing inlet in a direction that is substantially perpendicular to the longitudinal axis of the housing.

26. A fuel cell assembly as claimed in claim 13, wherein the housing inlet is oriented such fuel exits the housing inlet in a direction that is substantially perpendicular to the longitudinal axis of the housing.

27. A fuel cell assembly as claimed in claim 18, wherein
the housing includes at least one housing inlet associated with the upstream end of the fuel path; and
the housing inlet is oriented such fuel exits the housing inlet in a direction that is substantially perpendicular to the longitudinal axis of the housing.

* * * * *